(12) United States Patent  
Blevins

(10) Patent No.: US 9,751,151 B2
(45) Date of Patent: Sep. 5, 2017

(54) PLASMA CUTTER TRACING SYSTEM

(71) Applicant: James B. Blevins, Gibsonburg, OH (US)

(72) Inventor: James B. Blevins, Gibsonburg, OH (US)

( * ) Notice: Subject to any disclaimer, the term of this patent is extended or adjusted under 35 U.S.C. 154(b) by 142 days.

(21) Appl. No.: 14/023,349

(22) Filed: Sep. 10, 2013

(65) Prior Publication Data

US 2014/0263206 A1 Sep. 18, 2014

Related U.S. Application Data

(60) Provisional application No. 61/786,783, filed on Mar. 15, 2013.

(51) Int. Cl.
| | | |
|---|---|---|
| *B23K 37/02* | (2006.01) | |
| *B23K 37/04* | (2006.01) | |
| *B23K 26/00* | (2014.01) | |
| *B23K 10/00* | (2006.01) | |

(52) U.S. Cl.
CPC ............ *B23K 10/006* (2013.01); *B23K 10/00* (2013.01); *B23K 37/0288* (2013.01); *B23K 37/0461* (2013.01)

(58) Field of Classification Search
CPC ...... B23K 10/00; B23K 10/006; B23K 26/06; B23K 26/38; B23K 26/0876; B23K 26/0869; B23K 26/0892; B23K 37/0288; B23K 37/0229; B23K 2201/18; B23K 26/00; B23K 10/02; B23K 10/027; B23K 37/02; B23K 37/0211–37/0241; B23K 37/04; B23K 37/0408; B23K 37/0435–37/047; B25J 9/106; B25J 9/0048; B25J 9/1065; B25J 17/0266; B23Q 1/012; B23Q 2210/002; B27M 3/0073; B44B 1/02; Y10T 74/20329; Y10T 74/20305; Y10T 29/49833; Y10T 29/53317; Y10T 29/5343; Y10T 29/53978; G02B 7/005; G03F 7/70716; G05B 19/182
USPC .......................... 219/12.67, 121.78, 121.84, 219/121.36–121.45, 121.67; 33/22, 33/23.01, 25.5, 41.5; 101/67, 90, 113; 248/913; 266/63; 341/5; 345/14, 179; 346/139; 358/424, 478; 700/161, 163; 714/E11.212; 434/88, 163, 261; 409/86, 409/93
See application file for complete search history.

(56) References Cited

U.S. PATENT DOCUMENTS

| | | | |
|---|---|---|---|
| 2,626,540 A | | 1/1953 | Eserkaln |
| 2,678,496 A | | 5/1954 | Martin |
| 2,829,274 A | | 4/1958 | Schreck |
| 3,434,385 A | * | 3/1969 | Ray .......................... B44B 3/001 144/144.1 |
| 3,541,695 A | | 11/1970 | Kelsey |
| 3,581,622 A | | 6/1971 | Maass et al. |
| 3,720,804 A | | 3/1973 | Kriz |
| 4,078,474 A | * | 3/1978 | Laskowski .................... 409/107 |

(Continued)

*Primary Examiner* — Michael Laflame, Jr.
(74) *Attorney, Agent, or Firm* — Brenda J. Kruse

(57) ABSTRACT

A plasma cutter tracing system includes a positioning apparatus and a tracing apparatus. The positioning apparatus is configured to permit the tracing apparatus to traverse along an X-axis, a Y-axis, and a Z-axis and the tracing apparatus is configured to hold a plasma cutter and position the plasma cutter in a plane substantially parallel to a plane defined by a working surface which receives a workpiece to be replicated thereon.

18 Claims, 7 Drawing Sheets

(56) References Cited

U.S. PATENT DOCUMENTS

| | | | | |
|---|---|---|---|---|
| 4,095,633 | A | * | 6/1978 | Kimball ............... B23Q 35/102 |
| | | | | 144/135.3 |
| 4,101,754 | A | * | 7/1978 | Fischer ............... B23K 10/006 |
| | | | | 219/121.39 |
| 4,183,284 | A | * | 1/1980 | Laskowski ..................... 409/89 |
| 4,221,052 | A | * | 9/1980 | Wagoner ....................... 33/25.2 |
| 4,238,673 | A | | 12/1980 | Layden |
| 4,300,863 | A | * | 11/1981 | Partain ................ B23Q 35/102 |
| | | | | 409/103 |
| 4,355,786 | A | * | 10/1982 | Hamilton et al. ............... 266/62 |
| 4,364,695 | A | * | 12/1982 | Lenz ............................ 409/103 |
| 4,588,872 | A | * | 5/1986 | Bollinger et al. ....... 219/124.34 |
| 4,604,007 | A | * | 8/1986 | Hall ..................... B23Q 1/5468 |
| | | | | 33/23.11 |
| 4,623,288 | A | | 11/1986 | Brunelli et al. |
| 5,040,580 | A | * | 8/1991 | Hufford ............... B23Q 35/101 |
| | | | | 144/144.1 |
| 5,095,625 | A | | 3/1992 | Zimmerman |
| 5,193,282 | A | | 3/1993 | Aramaki et al. |
| 5,224,049 | A | | 6/1993 | Mushabac |
| 5,256,011 | A | * | 10/1993 | Taylor ............................ 409/92 |
| 5,993,123 | A | * | 11/1999 | Allred et al. .................. 409/109 |
| 6,132,150 | A | * | 10/2000 | Gaydos ............... B23Q 35/108 |
| | | | | 409/109 |
| 6,138,365 | A | * | 10/2000 | Wilkins ......................... 33/25.2 |
| 6,218,639 | B1 | * | 4/2001 | Bulle ....................... 219/121.39 |
| 6,939,507 | B2 | * | 9/2005 | Wagner ........................... 266/63 |
| 7,281,552 | B1 | * | 10/2007 | Coleman et al. ............. 144/360 |
| 7,854,068 | B2 | | 12/2010 | Di Benedetto |
| 2002/0053371 | A1 | * | 5/2002 | Pikna ......................... 144/144.1 |
| 2004/0173952 | A1 | * | 9/2004 | Wagner ........................... 266/48 |
| 2006/0108333 | A1 | | 5/2006 | Picard et al. |

\* cited by examiner

PLASMA CUTTER TRACING SYSTEM

CROSS REFERENCE TO RELATED APPLICATION

This application is entitled to claim the benefit of, and claims priority to, U.S. provisional patent application Ser. No. 61/786,783 filed Mar. 15, 2013, the entire disclosure of which in incorporated herein by reference.

FIELD OF THE INVENTION

The present invention relates generally to a contour-following tracing device and, more particularly, to a plasma cutter tracing system.

BACKGROUND OF THE INVENTION

Many forms of contour-following tracing devices for machine tools have been devised wherein a tracer or stylus follows a pattern and the movement of the stylus is duplicated by a cutting tool. The cutting tool engages a workpiece so that the path of the stylus, and the finished workpiece is a duplicate pattern. The operator moves a component of the device to maintain the stylus in contact with a pattern and the movement of the stylus is duplicated by the cutter. Such a manually-operated device must be capable of universal movement with a minimum of effort on the part of the operator. Commonly, the prior art devices are essentially based upon various forms of pantograph arrangements. Such arrangements have not been completely satisfactory since they are large in size occupying valuable floor space, cumbersome, traverse only in two directions, and lack flexibility in the workpieces which can be duplicated.

Accordingly, it would desirable to produce a plasma cutter tracing system which enhances operator convenience and productivity, minimizes required floor space, as well as provides equipment portability.

SUMMARY OF THE INVENTION

In concordance and agreement with the present disclosure, a plasma cutter tracing system which enhances operator convenience and productivity, minimizes required floor space, as well as provides equipment portability, has surprisingly been discovered.

In one embodiment, a tracing system, comprises: a positioning apparatus including a first working surface and a second working surface; and a tracing apparatus configured to position a working tool in such a manner that the working tool operates in a plane substantially parallel to a plane defined by the first working surface.

In another embodiment, a tracing system, comprises: a positioning apparatus; and a tracing apparatus configured to cooperate with the positioning apparatus, wherein the positioning apparatus is configured to permit the tracing apparatus to traverse along at least an X-axis, a Y-axis, and a Z-axis.

In yet another embodiment, a tracing system, comprises: a positioning apparatus including a first working surface and a second working surface disposed substantially parallel to the first working surface; and a tracing apparatus disposed on the positioning apparatus, the tracing apparatus including a frame having a holding fixture configured to support a working tool.

BRIEF DESCRIPTION OF THE DRAWINGS

The above, as well as other objects and advantages of the invention, will become readily apparent to those skilled in the art from a reading of the following detailed description of the invention when considered in the light of the accompanying drawings in which.

DETAILED DESCRIPTION OF THE INVENTION

Figure 1:
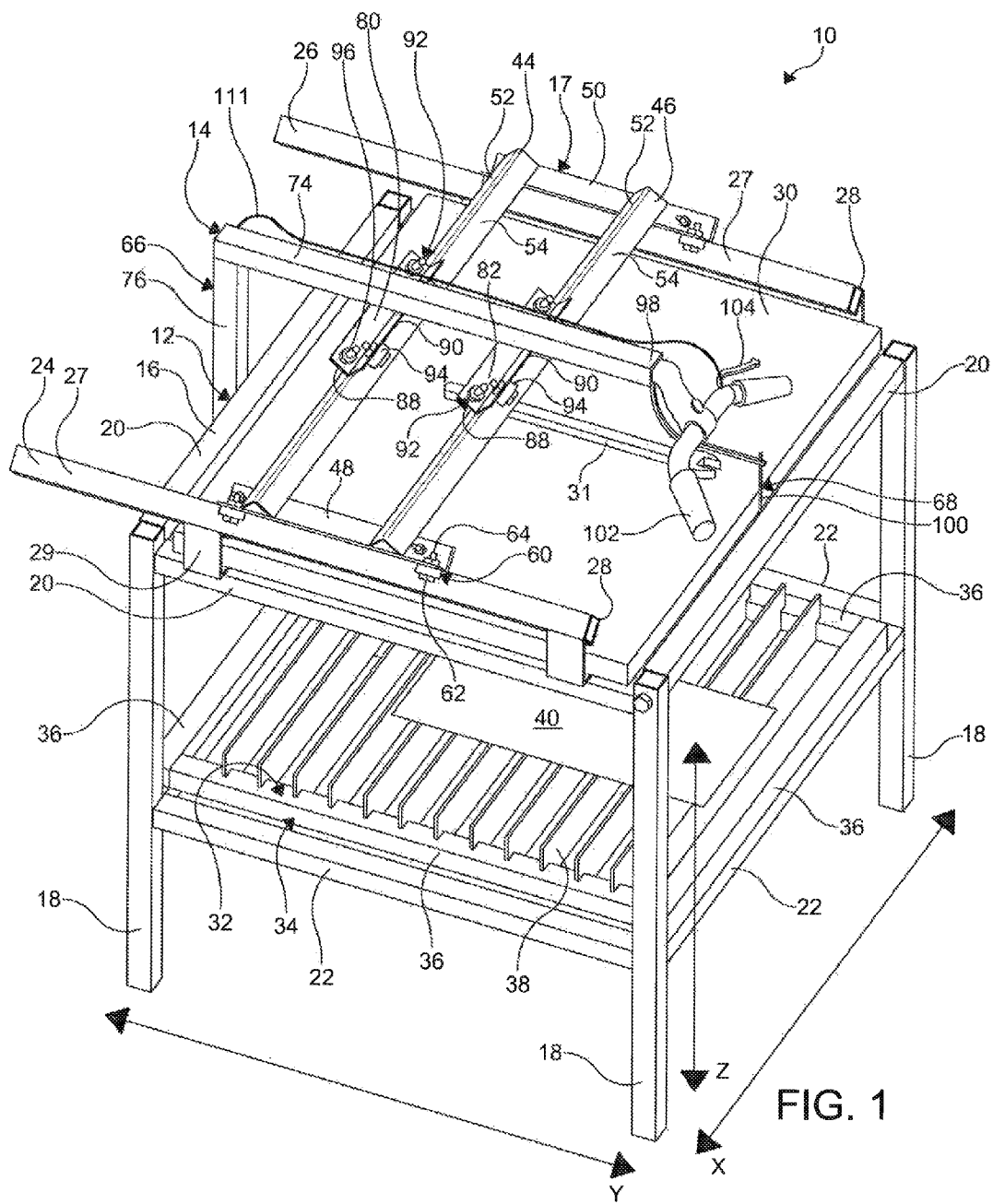
FIG. 1 is a perspective view of a plasma cutter tracing system according to an embodiment of the present invention.
Figure 2:
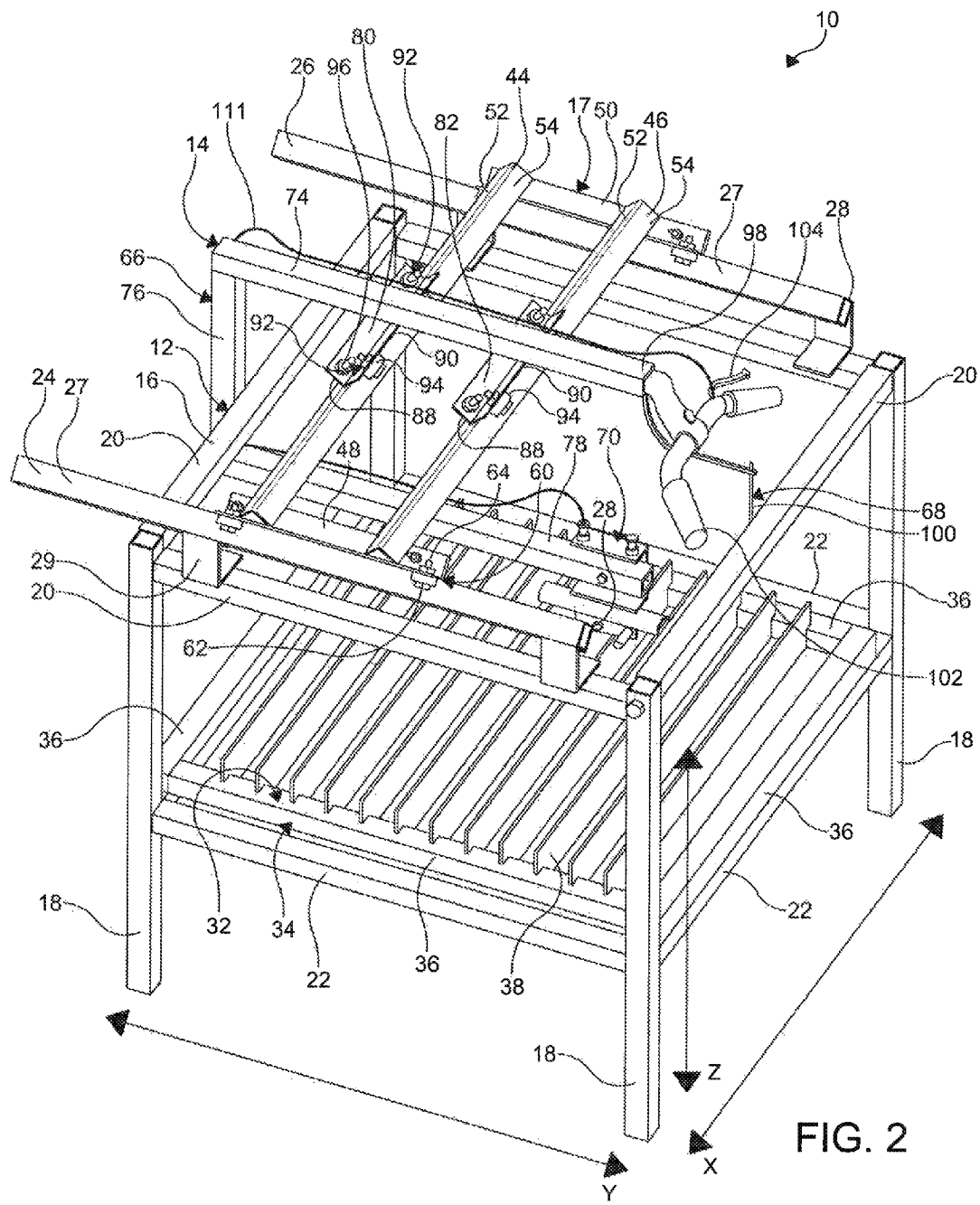
FIG. 2 is a perspective view of the plasma cutter tracing system illustrated in FIG. 1, wherein a first working surface has been removed.

The following detailed description and appended drawings describe and illustrate various exemplary embodiments of the invention. The description and drawings serve to enable one skilled in the art to make and use the invention, and are not intended to limit the scope of the invention in any manner.

FIGS. 1-2 and 6A-6C depict a tracing system 10 according to an embodiment of the present invention. It is understood that the system 10 can be in communication with various automated machines and systems such as a computer numerical control (CNC) machine, for example, to facilitate an automatic operation of the system 10. The tracing system 10 shown is configured to employ a working tool such as a plasma cutter, for example. The system 10 includes a positioning apparatus 12 and a tracing apparatus 14. As illustrated, the positioning apparatus 12 includes a table-like frame 16 having a movable carriage 17 disposed thereon. In certain embodiments, the frame 16 includes a plurality of upstanding leg members 18, a pair of spaced apart braces 20, 22 extending between each pair of the leg members 18, and a pair of spaced apart support rails 24, 26 coupled to respective opposing braces 20. It is understood that the rails 24, 26 may be held at a desired distance apart by at least one cross-member if desired.

Each of the support rails 24, 26 shown is an elongate member having a first surface 27 and a second surface 28. In a non-limiting example, the surfaces 27, 28 are formed at an angle of about 90 degrees to each other. The rails 24, 26 can have any shape and size as desired. For example, one or more of the rails 24, 26 can have an L-shaped cross-section, a triangular shaped cross-section, and a rectangular shaped cross-section, for example. Various connecting means and devices can be employed to couple the support rails 24, 26 to the braces 20. For example, a plurality of mounts 29 may be disposed on the rails 24, 26 to support and space the rails 24, 26 from a first working surface 30 (i.e. a table top). The mounts 29 can be formed from any suitable material as desired such as a metal material, an elastomeric material, or plastic material, for example.

As illustrated in FIG. 1, the first working surface 30 cooperates with the frame 16. The first working surface 30 can be separate and distinct from the frame 16 or integrally formed with the frame 16 if desired. Additionally, the first working surface 30 can be permanently affixed or removably coupled to the frame 16 as desired. In certain embodiments, the first working surface 30 is supported by at least one of the braces 20. In other embodiments, the first working surface 30 can be supported by at least one of the braces 20, the leg members 18, the mounts 29, or any combination thereof, as well as other suitable means as desired. The first working surface 30 shown is substantially planar. It is understood, however, that the first working surface 30 may include any surface irregularity or surface treatment as desired such as a plurality of protuberances or a non-slip coating, for example, to maximize a strength and durability of the first working surface 30 and/or to militate against movement of a workpiece 31 to be replicated which is disposed thereon.

A second working surface 32 also cooperates with the frame 16. The second working surface 32 can be separate and distinct from the frame 16 or integrally formed with the frame 16 if desired. Additionally, the second working surface 32 can be permanently affixed or removably coupled to the frame 16 as desired. In certain embodiments, the second working surface 32 is formed by a sub-frame 34 having a plurality of members 36 and a linear array of spaced apart metal slats 38 extending between opposing members 36 thereof. As illustrated, the second working surface 32 is supported by at least one of the braces 22. It is understood, however, that the second working surface 32 can be formed by various other means and from any suitable materials as desired such as expanded stainless steel mesh, for example. The second working surface 32 is configured to maximize a strength and durability thereof, militate against movement of a material 40 (shown in FIG. 1) disposed thereon from which a replicate is formed, and permit molten material 40 to disperse and heat to dissipate.

In the embodiment shown, the first working surface 30 and the second working surface 32 are positioned with respect to one another such that the working surfaces 30, 32 are substantially aligned and a plane defined by the first working surface 30 is substantially parallel to a plane defined by the second working surface 32. It is understood, however, that the first working surface 30 can be positioned with respect to the second working surface 32 in any such manner as desired. It is also understood that the second working surface 30 may include any surface irregularity or surface treatment as desired such as a plurality of protuberances or a non-slip coating, for example, to further maximize a strength and durability thereof, militate against movement of the material 40 disposed thereon, and permit molten material 40 to disperse and heat to dissipate.

In certain embodiments, the carriage 17 is movably disposed on the support rails 24, 26 of the frame 16. The carriage 17 moves on top of the rails 24, 26 along a Y-axis (shown in FIG. 6B). The carriage 17 includes a pair of spaced apart elongated members 44, 46, and a pair of spaced apart cross-members 48, 50. The cross-member 48 is coupled to a first end of each of the members 44, 46 and the cross-member 50 is coupled to a second end of each of the members 44, 46. Various means can be used to couple the cross-members 48, 50 to the members 44, 46. For example, the cross-members 48, 50 may be coupled to the members 44, 46 by an adhesive, mechanical connectors (i.e. fasteners, clips, etc.), and other joining methods (i.e. welding, brazing, soldering, etc.). Each of the members 44, 46 has a first surface 52 and a second surface 54. In a non-limiting example, the surfaces 52, 54 are formed at an angle of about 90 degrees to each other. The members 44, 46, 48, 50 can have any shape and size as desired. For example, one or more of the members 44, 46, 48, 50 can have an L-shaped cross-section, a triangular shaped cross-section, and a rectangular shaped cross-section, for example.

One or more guide elements 60 are disposed on each of the cross-members 48, 50. In certain embodiments, a pair of the guide elements 60 is disposed in each end of the cross-members 48, 50. The guide elements 60 are configured to smoothly move along at least one of the surfaces 27, 28 of the rails 24, 26. In a non-limiting example, each of the guide elements 60 is a roller bearing 62 affixed to the respective one of the cross-members 48, 50 by a fastener 64. It is understood, however, that the guide elements 60 can be affixed to the cross-members 48, 50 by any means as desired such as an adhesive, other mechanical connectors (i.e. clips, clamps, etc.), or other joining means (i.e. welding, brazing, soldering, etc.). It is also understood that each of the rails 24, 26 and the members 44, 46, 48, 50 can be formed from any material as desired such as a metal material or a plastic material, for example.

Figure 3:
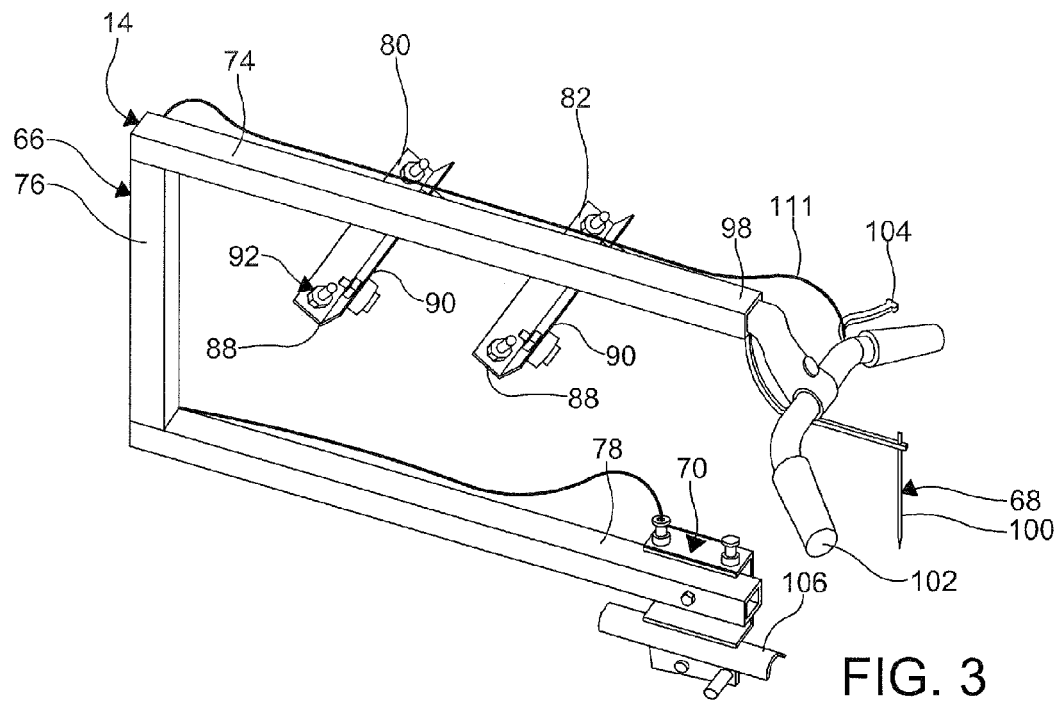
FIG. 3 is a perspective view of a tracing apparatus of the plasma cutter tracing system illustrated in FIGS. 1-2.
Figure 4:
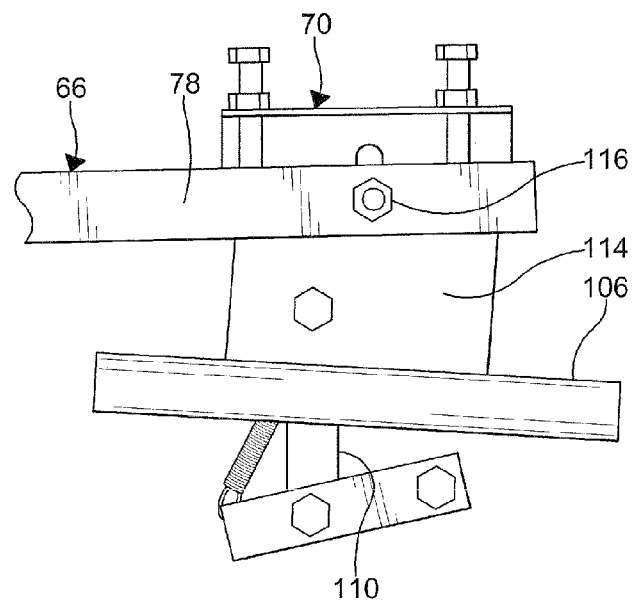
FIG. 4 is a fragmentary left side perspective view of a portion of the tracing apparatus of the plasma cutter tracing system illustrated in FIGS. 1-2.
Figure 5:
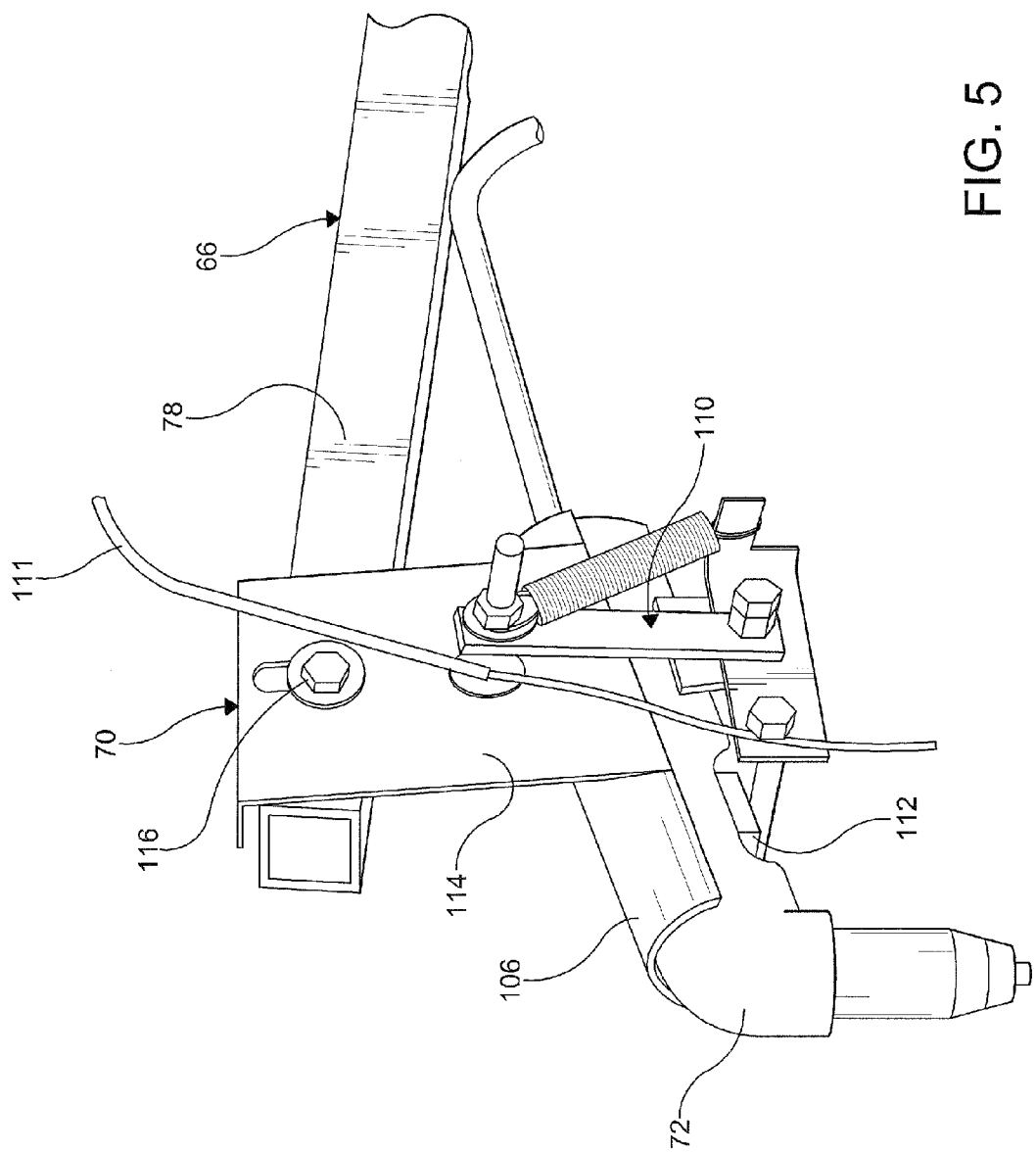
FIG. 5 is a fragmentary right side perspective view of the portion of the tracing apparatus of the plasma cutter tracing system illustrated in FIGS. 1-2, wherein a holding fixture of the tracing apparatus includes a plasma cutter disposed therein.
Figure 6A:
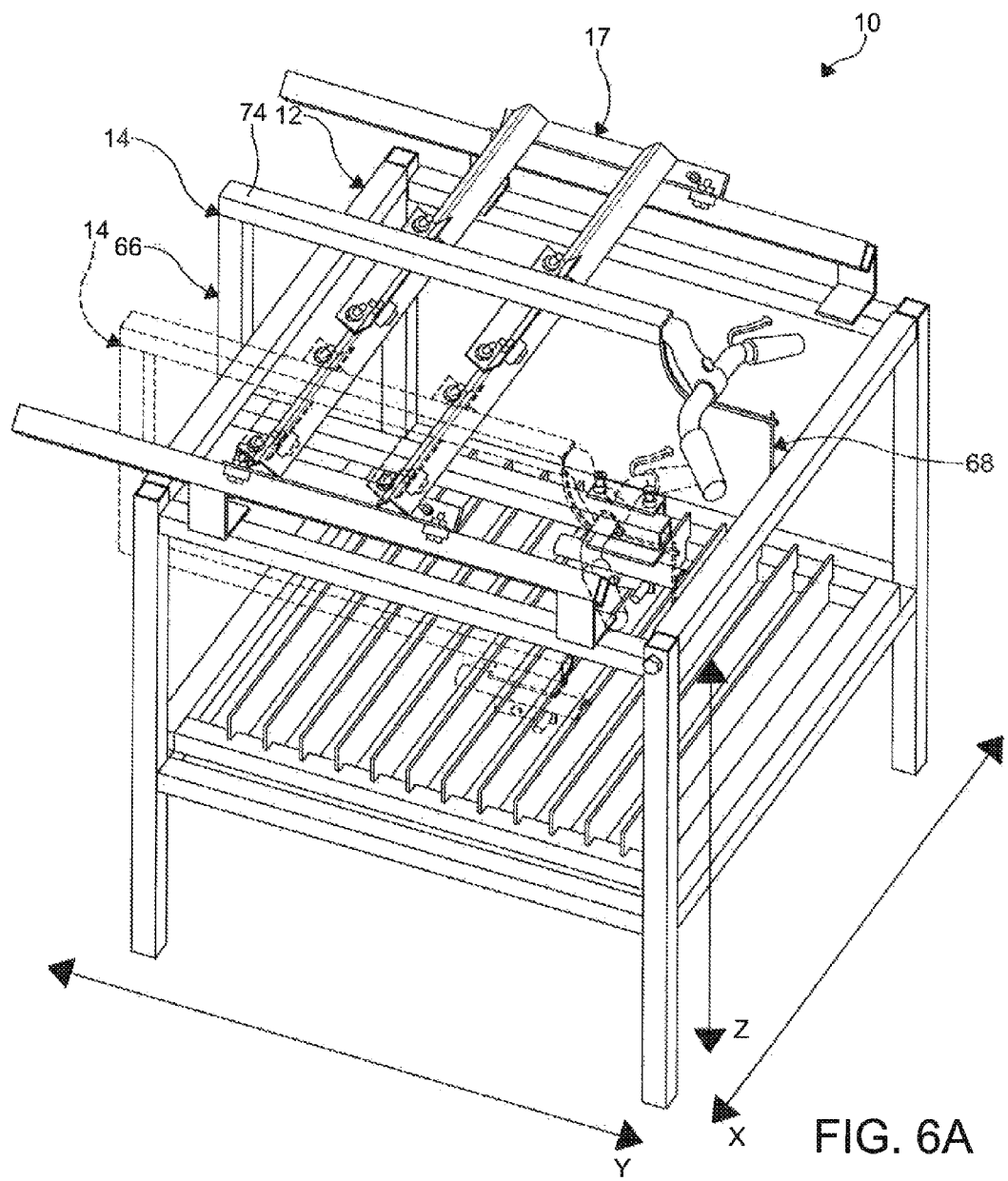
FIG. 6A is a perspective view of the plasma cutter tracing system illustrated in FIGS. 1-2, wherein the first working surface has been removed and a movement of the tracing apparatus along an x-axis is shown in dashed lines.
Figure 6B:
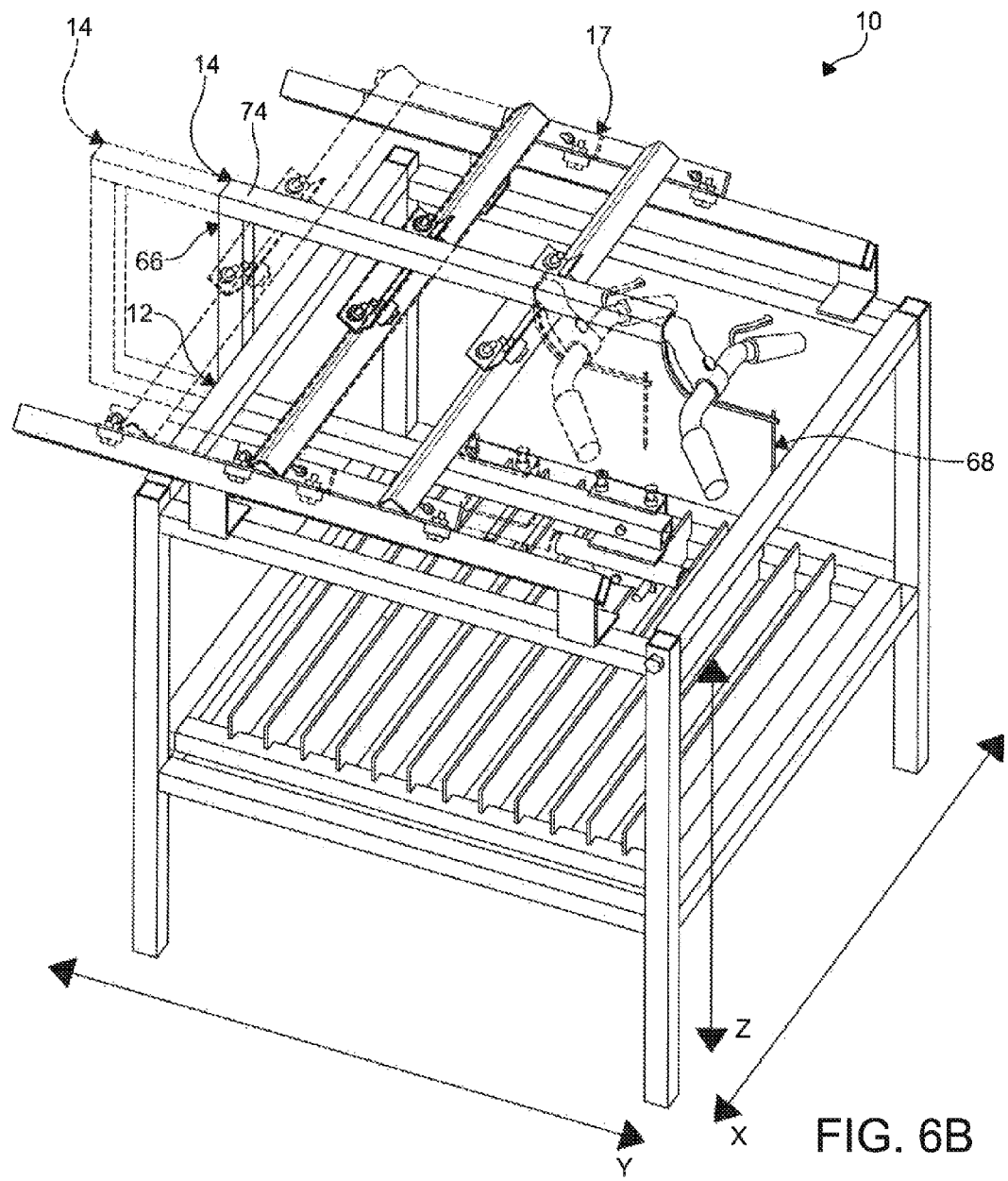
FIG. 6B is a perspective view of the plasma cutter tracing system illustrated in FIGS. 1-2, and 6A, wherein the first working surface has been removed and a movement of the tracing apparatus along a Y-axis is shown in dashed lines.
Figure 6C:
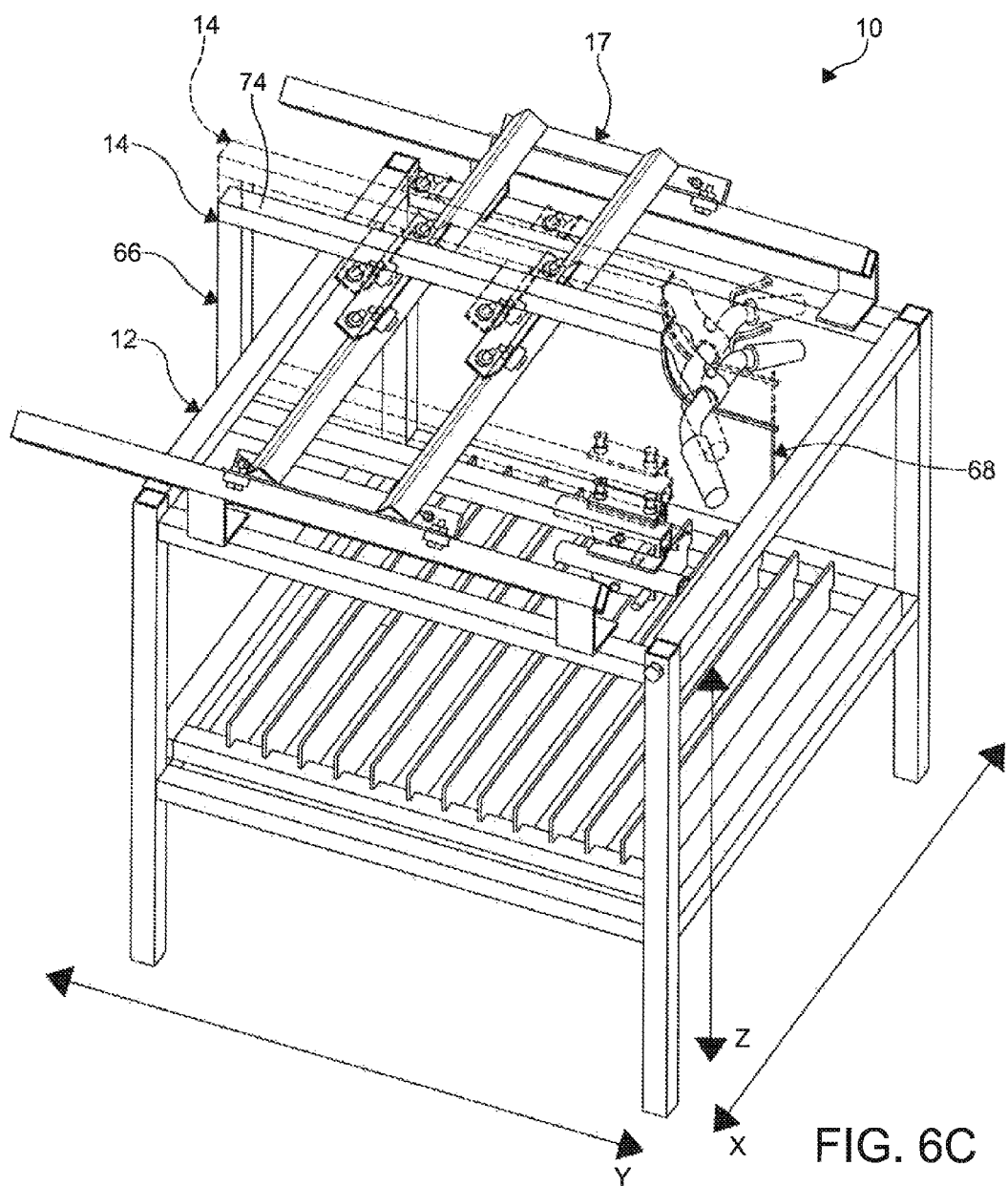
FIG. 6C is a perspective view of the plasma cutter tracing system illustrated in FIGS. 1-2 and 6A-6B, wherein the first working surface has been removed and a movement of the tracing apparatus along a Z-axis is shown in dashed lines.

As more clearly shown in FIG. 3, the tracing apparatus 14 includes a frame 66 having a stylus assembly 68 and a holding fixture 70 configured to support a working tool 72 (i.e. the plasma cutter shown in FIG. 5) disposed therein. In certain embodiments, the frame 66 is formed by members 74, 76, 78. Although the members 74, 76, 78 shown are separate components, it is understood that the members 74, 76, 78 can be integrally formed to produce a unitary frame 66 if desired. Each of the members 74, 76, 78 can be any shape and size as desired. The members 74, 76, 78 cooperate in such a manner that the holding fixture 70 is positioned in a plane substantially parallel to a plane defined by the first working surface 30. The frame 66 cooperates with the positioning apparatus 12 in such a manner that the frame 66 can be moved along an X-axis (shown in FIG. 6A), along the Y-axis (shown in FIG. 6B), and/or along a Z-axis (shown in FIG. 6C). Accordingly, the system 10 is capable of tracing both an outer periphery and inner features of the workpiece 31 to be replicated.

A pair of spaced apart guide members 80, 82 is disposed on the frame 66. In certain embodiments, an intermediate portion between a first end and a second end of the guide members 80, 82 is coupled to a lower surface of the member 74. The guide members 80, 82 are positioned substantially parallel to each other and substantially perpendicular to the member 74. Various means can be used to couple the guide members 80, 82 to the frame 66 such as an adhesive, mechanical connectors (i.e. fasteners, clips, etc.), and other joining methods (i.e. welding, brazing, soldering, etc.), for example. Each of the guide members 80, 82 has a first surface 88 and a second surface 90. In a non-limiting example, the surfaces 88, 90 are formed at an angle of about 90 degrees to each other. It is understood that the guide members 80, 82 can have any shape and size as desired such as an L-shaped cross-section, a triangular shaped cross-section, and a rectangular shaped cross-section, for example.

The guide members 80, 82 move on top of the members 44, 46 along the X-axis. As illustrated, each of the guide members 80, 82 includes one or more guide elements 92 disposed thereon. In certain embodiments, a pair of the guide elements 92 is disposed in each of the first end and the second end of the guide members 80, 82. The guide elements 92 are configured to smoothly move along at least one of the surfaces 52, 54 of the members 44, 46. In a non-limiting example, each of the guide elements 92 is a roller bearing 94 affixed to a respective one of the guide members 80, 82 by a fastener 96. It is understood, however, that the guide elements 92 can be affixed to the guide members 80, 82 by any means as desired such as an adhesive, other mechanical connectors (i.e. clips, clamps, etc.), or other joining means (i.e. welding, brazing, soldering, etc.). It is also understood that each of the guide members 80, 82 can be formed from any material as desired such as a metal material or a plastic material, for example.

As shown in FIGS. 1-3 and 6A-6C, the stylus assembly 68 is coupled to an end 98 of the member 74. The stylus assembly 68 includes a stylus 100 for tracing the workpiece 31 and one or more hand controls 102 for positioning the stylus 100. A manual control 104 may be affixed to one of the hand controls 102 for remotely operating the working tool 72 disposed in the holding fixture 70. As illustrated in FIG. 1, the holding fixture 70 is disposed underneath the first working surface 30 to minimize cost and space occupied by the system 10. In certain embodiments shown in FIG. 5, the holding fixture 70 includes a holder 106 coupled to an end of the member 78 and a trigger mechanism 110 in communication with the manual control 104 via a cable 111 and configured to selectively activate a trigger 112 of the working tool 72. It is understood that the holder 106 can be coupled to the member 78 by any means as desired such as by a mount 114 affixed thereto by a fastener 116, for example.

In use, an operator positions the workpiece 31 to be replicated on the first working surface 30 and a blank of material 40 on the second working surface 32 located underneath the first working surface 30. The operator then grasps the hand controls 102 of the tracing apparatus 14 and proceeds to guide the stylus 100 around contours and features of the workpiece 31. As the stylus 100 is guided around the workpiece 31, the operator simultaneously engages the manual control 104 which causes the trigger mechanism 110 to engage the trigger 112, thereby activating the working tool 72. When the working tool 72 is activated, heated fluid (i.e. heated air) commonly referred to as "plasma" is emitted by the working tool 72. The plasma cuts through the blank of material 40, essentially copying the features of the workpiece 31 being traced onto the blank of material 40. The operator guides the stylus 100 around the workpiece 31 until all desired features thereof have been traced. Once tracing of the workpiece 31 is complete, the operator releases the manual control 104 which causes the trigger mechanism 110 to disengage the trigger 112, thereby deactivating the working tool 72. Accordingly, a replicate having substantially the same features as the workpiece 31 is produced.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A tracing system, comprising:
   a positioning apparatus including a frame, a first working surface, and a second working surface, wherein the frame includes a plurality of spaced apart support rails having a movable carriage movably disposed thereon, wherein the movable carriage includes a plurality of spaced apart elongated members extending over the first working surface and a plurality of spaced apart cross-members, each of the cross-members coupled to at least, one of the elongated members and movably disposed on at least one of the support rails, and wherein the first working surface is vertically aligned and vertically spaced from the second working surface; and
   a tracing apparatus configured to position a working tool in such a manner that the working tool operates in a plane substantially parallel to a plane defined by the first working surface, wherein the tracing apparatus is configured to cooperate with the positioning apparatus to permit the tracing apparatus to traverse along at least three axes.

2. The tracing system of claim 1, wherein the working tool is a plasma cutter.

3. The tracing system of claim 1, wherein the first working surface is configured to receive a workpiece to be replicated thereon and the second working surface is configured to receive a material from which a replicate of the workpiece is formed.

4. The tracing system of claim 1, wherein the tracing apparatus includes a frame having a stylus assembly and a holding fixture, the holding fixture configured to support the working tool.

5. The tracing system of claim 1, wherein the tracing apparatus is configured to cooperate with the movable carriage of the positioning apparatus to permit the tracing apparatus to traverse along at least one of an X-axis, a Y-axis, and a Z-axis.

6. A tracing system, comprising:
   a positioning apparatus including a movable carriage, a first working surface, and a second working surface, wherein the movable carriage includes a plurality of spaced apart elongated members extending over the first working surface and a plurality of spaced apart cross-members, each of the cross-members coupled to at least one of the elongated members, and wherein the first working surface is vertically aligned and vertically spaced from the second working surface; and
   a tracing apparatus configured to cooperate with the positioning apparatus, wherein the positioning apparatus is configured to permit the tracing apparatus to traverse along an X-axis, a Y-axis, and a Z-axis, wherein the tracing apparatus includes a first frame having a stylus assembly and a holding fixture configured to support a working tool, wherein the first frame of the tracing apparatus includes a plurality of spaced apart guide members, each of the guide members movably disposed on at least one of the elongated members of the movable carriage, and wherein the tracing apparatus is configured to cause a substantially simultaneous movement of the stylus assembly and the working tool along the X-axis, the Y-axis, and the Z-axis.

7. The tracing system of claim 6, wherein the first working surface is configured to receive a workpiece to be replicated thereon and the second working surface is configured to receive a material from which a replicate of the workpiece is formed.

8. The tracing system of claim 6, wherein the positioning apparatus includes a second frame having at least one support rail coupled thereto.

9. The tracing system of claim 8, wherein the movable carriage cooperates with the at least one support rail.

10. The tracing system of claim 6, wherein the tracing apparatus is configured to cooperate with the movable carriage of the positioning apparatus to permit the tracing apparatus to traverse along at least one of the X-axis, the Y-axis, and the Z-axis.

11. A tracing system, comprising:
   a positioning apparatus including a first frame, a first working surface, and a second working surface disposed substantially parallel to the first working surface, wherein the first frame includes a plurality of spaced apart stationary support rails having a movable carriage movably disposed thereon, wherein the movable carriage includes a plurality of spaced apart elongated members extending over the first working surface and a plurality of spaced apart cross-members, each of the cross-members coupled to at least one of the elongated members and movably disposed on at least one of the stationary support rails, and wherein the first working surface is vertically aligned and vertically spaced from the second working surface; and
   a tracing apparatus disposed on the positioning apparatus, the tracing apparatus including a second frame having a holding fixture configured to support a working tool, wherein the second frame of the tracing apparatus includes a plurality of spaced apart guide members, each of the guide members movably disposed on at least one of the elongated members of the movable carriage, and wherein the tracing apparatus is configured to cooperate with the movable carriage of the positioning apparatus to permit the tracing apparatus to traverse along at least one of an X-axis, a Y-axis, and a Z-axis.

12. The tracing system of claim 11, wherein the tracing apparatus is configured to position the working tool in such a manner that the working tool operates in a plane substantially parallel to a plane defined by the first working surface.

13. The tracing system of claim 11, wherein the first working surface is configured to receive a workpiece to be replicated thereon.

14. The tracing system of claim 13, wherein the second working surface is configured to receive a material from which a replicate of the workpiece is formed.

15. The tracing system of claim 1, wherein at least one of the spaced apart support rails of the positioning apparatus has a first surface and a second surface formed at an angle of about 90 degrees to each other.

16. The tracing system of claim 1, wherein at least one of the spaced apart elongated members of the movable carriage has a first surface and a second surface formed at an angle of about 90 degrees to each other.

17. The tracing system of claim 1, wherein at least one of the spaced apart cross-members of the movable carriage has a first surface and a second surface formed at an angle of about 90 degrees to each other.

18. The tracing system of claim 6, wherein at least one of the spaced apart guide members of the first frame of the tracing apparatus has a first surface and a second surface formed at an angle of about 90 degrees to each other.

* * * * *